US007952756B1

(12) United States Patent
Kulkarni

(10) Patent No.: US 7,952,756 B1
(45) Date of Patent: May 31, 2011

(54) METHODS AND SYSTEMS FOR ENCODING OVER-RANGE COLOR VALUES USING IN-RANGE VALUES

(75) Inventor: Manish S. Kulkarni, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 957 days.

(21) Appl. No.: 11/777,009

(22) Filed: Jul. 12, 2007

(51) Int. Cl.
*G06F 15/00* (2006.01)
*G06K 1/00* (2006.01)

(52) U.S. Cl. ......... 358/1.9; 358/501; 358/539; 382/162; 382/166

(58) Field of Classification Search ............... 358/1.1, 358/1.9, 500, 501, 518, 539, 426.01; 382/162, 382/166, 232, 233
See application file for complete search history.

(56) References Cited

U.S. PATENT DOCUMENTS

| | | | |
|---|---|---|---|
| 5,377,025 A | 12/1994 | Spaulding et al. | |
| 5,835,244 A | 11/1998 | Bestmann | |
| 6,124,944 A * | 9/2000 | Ohta ............................. | 358/1.9 |
| 6,178,008 B1 | 1/2001 | Bockman et al. | |
| 6,208,351 B1 | 3/2001 | Borg et al. | |
| 6,466,333 B1 | 10/2002 | Schoolcraft et al. | |
| 6,519,361 B1 | 2/2003 | Taillie et al. | |
| 6,657,746 B1 | 12/2003 | Fuchigami et al. | |
| 6,724,500 B1 | 4/2004 | Hains et al. | |
| 6,781,716 B1 | 8/2004 | Yoda | |
| 6,870,636 B2 | 3/2005 | Kulkarni | |
| 7,023,585 B1 | 4/2006 | Borg | |
| 7,030,888 B1 | 4/2006 | Edge et al. | |
| 7,595,921 B2 | 9/2009 | Ito et al. | |
| 2001/0033286 A1 | 10/2001 | Stokes et al. | |
| 2003/0185437 A1 * | 10/2003 | Nakami ........................ | 382/162 |

FOREIGN PATENT DOCUMENTS

| | | |
|---|---|---|
| EP | 0 706 287 | 4/1996 |
| EP | 0 901 278 | 3/1999 |
| EP | 1 107 090 | 6/2001 |

OTHER PUBLICATIONS

Florian Kainz, "A Proposal for Open EXR Color Management," *Industrial Light & Magic*, Revision 5, Aug. 5, 2004, 9 pages.
Johannes Kopf et al., "Capturing and Viewing Gigapixel Images," *ACM Transactions on Graphics (Proceedings of SIGGRAPH 2007)*, vol. 26, No. 3, 10 pages.
PCT International Search Report, PCT/US2008/068436, Feb. 27, 2009, pp. 1-3.
PCT Written Opinion of the International Searching Authority, PCT/US2008/068436, Feb. 27, 2009, pp. 1-7.
Manish S. Kulkarni et al., "System and Method for Converting Over-Range Colors" U.S. Appl. No. 11/770,440, filed Jun. 28, 2007, Office Action mailed Feb. 1, 2010, 14 pages.

(Continued)

*Primary Examiner* — Thomas D Lee
(74) *Attorney, Agent, or Firm* — Fish & Richardson P.C.

(57) ABSTRACT

A method includes receiving an input file comprising input color values in a first color space. The at least one input color value includes an over-range color value in the first color space. The method also includes encoding the input color values including encoding each over-range color value as an in-range color value in the first color space to generate encoded input color values. The method further includes creating an output file that includes the encoded color values and an indicator. The indicator indicates that the output file includes encoded color values.

24 Claims, 2 Drawing Sheets

OTHER PUBLICATIONS

Manish S. Kulkarni et al., "System and Method for Converting Over-Range Colors" U.S. Appl. No. 11/770,440, filed Jun. 28, 2007, Amendment filed Apr. 29, 2010, 15 pages.

Manish S. Kulkarni et al., "System and Method for Converting Over-Range Colors" U.S. Appl. No. 11/770,440, filed Jun. 28, 2007, Final Office Action mailed Jun. 23, 2010, 22 pages.

* cited by examiner

METHODS AND SYSTEMS FOR ENCODING OVER-RANGE COLOR VALUES USING IN-RANGE VALUES

BACKGROUND

The present disclosure relates to computer systems, and more particularly to a method and system for encoding over-range color values using in-range values.

Digital devices that create (e.g., scanners and digital cameras), display (e.g. CRT and LCD monitors), or print (e.g. ink jet and laser printers) colors typically define color data using color spaces. Generally, a color space is a combination of a color model and a gamut. A color model defines each color within the model using color components, such as, in the case of a Red, Green, Blue (RGB) color model, the levels of red, green, and blue light components needed to create each color. Levels of each component in the RGB color model typically range from 0 to 100 percent of full intensity, or which may be represented on a scale of 0 to 1. By varying the levels or intensities of the components, each color in the color model may be created. However, as a practical matter a device is often limited in its ability to create pure red, green, or blue light, which limits its range of colors or color gamut. A gamut is simply the range of colors that may be displayed on or captured by a particular device.

The differences in device gamuts lead to differences in color spaces between two devices. For example, two devices that use RGB may show different colors when each displays its most intense red. The most intense red on a first device may have an intensity of 1 for the R component and 0 for the G and B components. However, the color that looks the same as the most intense red of the first device may have a red intensity of 0.85 on a second device. Moreover, the G and B component intensities may even be 0.05 on the second device. In other words, the same perceived "red" color has different RGB component values depending on the device, on the first device it may be (1, 0, 0) and on the second device that same "red" may be (0.85, 0.05, 0.05). This means that an image file containing only RGB values, if displayed directly by both devices, would appear differently on the two devices.

To solve this problem of the same component values appearing differently on different devices, color spaces are defined in relation to device-independent color spaces, which define colors in more absolute terms. Some examples of device-independent color spaces include the CIE XYZ and CIE L*a*b* color spaces. Many systems and applications use the sRGB color space, whose relation to the device-independent color spaces is well-known in the art. The relationship of a device's native color space with a device-independent color space typically is described by some combination of formulas, transfer functions, matrices, and look up tables. This relationship may be stored in an International Color Consortium (ICC) profile for the device. The device-independent color space may be used as an intermediate when converting from one device-dependent color space to another.

Color component values may be expressed digitally in a variety of ways. To keep the size of image files manageable, typically a certain fixed number of bits are devoted to expressing each color component of each pixel (A pixel, or picture element, is the smallest component, and basic building block, of a digital image). For example, an 8-bit per component image may express 256 discrete values of intensities for each component. That is, in an RGB image, 8-bits per channel may correspond to 256 intensity levels of Red, of Green, and of Blue component light. These 256 values may be represented as integer values ranging from 0 to 255, or decimal values ranging from 0 to 1. The decimal values may be floating point, resulting in a dynamic range of values, or may be fixed-point, resulting in a fixed range. For example, a 16-bit fixed-point value may reserve 1-bit for the sign of a decimal number, 2-bits for the integer portion of the decimal number, and 13-bits for the fractional portion of a decimal number, resulting in a fixed range ranging from −4 to 3.9998779296875 (i.e., 4−2^(−13)).

SUMMARY

This specification describes technologies relating to the encoding of over-range colors.

In general, one aspect of the subject matter described in this specification can be embodied in a method that includes receiving an input file comprising input color values in a first color space, wherein at least one input color value comprises an over-range color value in the first color space. The method also includes encoding the input color values including encoding each over-range color value as an in-range color value in the first color space to generate encoded input color values. The method also includes creating an output file comprising the encoded color values and an indicator, wherein the indicator indicates that the output file comprises encoded color values. Other embodiments of this aspect include corresponding systems, and computer program products.

These and other embodiments can optionally include one or more of the following features. The method can further include decoding the color values in the output file based on the indicator. The first color space can include an scRGB color space. The input file can include an Extensible Markup Language Paper Specification (XPS) file. The at least one input color value can be less than zero or greater than one. Encoding the input color values can include clipping the input color values to fit within a pre-determined range; subtracting the minimum value of the predetermined range from the maximum value of the predetermined range to obtain a difference; and determining an encoded value for each input color value by subtracting the minimum value from the input color value and dividing the result by the difference. The pre-determined range can be based on the range of color values in the input file. The pre-determined range can range from −4 to +3.9998779296875. Encoding the input color values can include determining a range of interest for the input color values; dividing the range of interest into a plurality of sub-ranges; and encoding the input color values based on a level of accuracy assigned to a sub-range that the input color value falls within. The output file can be a portable document format (PDF) file, a Joint Photographic Experts Group (JPEG) file, or a Tagged Image File Format (TIFF) file. The in-range can range from 0 to 1. The indicator can include an International Color Consortium (ICC) profile. The ICC profile can include decoding information.

Particular embodiments of the subject matter described in this specification can be implemented to realize one or more of the following advantages. Over-range colors may be encoded with minimal loss in color quality. Additionally, the encoded can be accomplished without requiring changes to the specification of the target output file, such as a PDF or a TIFF file.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
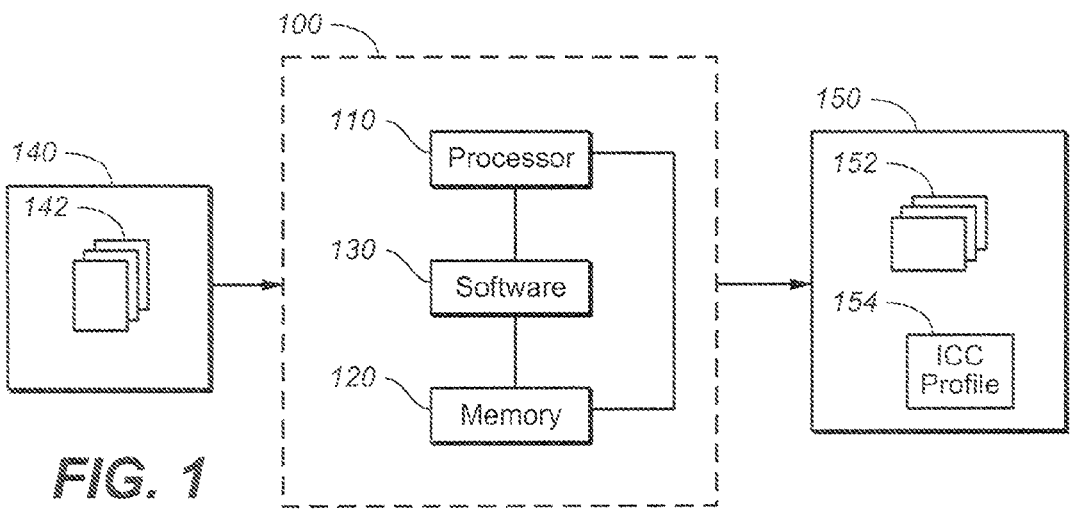
FIG. 1 is a block diagram of a color encoding system.

The sRGB color space has been widely adopted and is often considered the standard color space for digital files containing color data. One drawback of using the sRGB color space is its limited gamut. The range of colors detectable by the human eye far exceeds the range of colors in the sRGB color gamut. With the increasing gamuts of today's and tomorrow's cameras, printers, and monitors, color data increasingly may contain colors that are outside the sRGB gamut. Color data are often included in files or documents that are converted from one format to another. Sometimes these files and documents are saved and re-formatted several times. Each format change exposes the possibility that some color data may be lost as formats differ in how color values may be expressed (e.g., 8-bit integer, 16-bit fixed-point, 32-bit floating point, etc.). For example, many standard formats such as the Portable Document Format (PDF) allow colors to be represented only with values ranging from 0 to 1, or within a specified integer range (i.e., in-range colors). Converting a document or file that utilizes the full scRGB color space, which allows color values less than 0 and greater than 1, may result in significant loss of color data if the conversion simply clipped those values that lie outside of the 0 to 1 range. Once in PDF, the color data is forever lost downstream. That is, if the PDF document was printed by a printer having a gamut equal to the gamut of scRGB, the printed page would not display all of the colors in the original document because many colors would be lost in the conversion process. One option to preserve the color data is to revise the standard formats to allow color values that are less than 0 and greater than 1. This option, however, may result in widespread incompatibilities between versions of the standard and may defeat the purpose of the standard. The current subject matter, on the other hand, allows for the maintenance of over-range data while working within the confines of the existing standard formats. Preserving colors outside of the sRGB gamut, even when such colors are unusable in a given application allows for flexibility in downstream processing and reduces the bottleneck associated with going through some standard file formats that only allow values in a 0 to 1 range.

The term "in-range," as used herein, refers to component values falling within the range defined by the minimum and the maximum intensity values for each color component in a color space, such as sRGB. For example, many color spaces based on RGB, YCrCb, and other color models may have in-range values expressed as values between 0 and 1, inclusively. The term "over-range," as used herein, refers to values falling outside the range minimum and maximum intensity values for each color component in a color space. Over-range values are typically expressed as values less than 0 or greater than 1. The set of in-range values for a color space includes a predetermined minimum color value and a predetermined maximum color value that bound a substantial continuum of intensities for the color component values, and the set of over-range values includes values representing intensities for the at least one color component outside of the bounded substantial continuum of intensities. The substantial continuum of intensities may have a limited number of discrete values depending on the bit depth (e.g., 8-bit, 16-bit, 32-bit).

Some color spaces that typically express colors using over-range values include, but are not limited to, scRGB, xvYCC, e-sYCC, and e-sRGB.

Some document formats may be limited to expressing color component values as floating- or fixed-point values ranging from 0 to 1 (e.g., PDF and TIFF). Because of this limited expression, over-range values are often lost when converting to document formats with this type of limited expression because values outside of the 0 to 1 range are usually clipped or ignored during the conversion process.

As shown in FIG. 1, a color encoding system 100 includes memory 120 and a processor 110 executing encoding software 130. Generally, the color encoding system 100 may receive an input document 140 having color data 142, some of which are over-range values, encode the color data 142 using the encoding software 130, and create an output file 150 that includes encoded color data 152.

A processor 110 may be suitable for the execution of a computer program, and includes, by way of example, both general and special purpose microprocessors, and any one or more processors of any kind of digital computer. Moreover, the processor 110 may be embedded in another device, e.g., a mobile telephone, a personal digital assistant (PDA), a mobile audio player, a Global Positioning System (GPS) receiver, a notebook computer, a desktop computer, or a server, to name just a few possible examples. Generally, a processor will be operatively coupled to receive data and/or instructions from, or transfer data to, a memory 120.

The memory 120 is a computer readable media suitable for storing computer program instructions and data. The memory 120 may be any form of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store the encoding software 130 and other data as used in the execution of the encoding software 130. The processor 110, memory 120, and/or encoding software 130 may be supplemented by, or incorporated in, special purpose logic circuitry.

Encoding software 130 is a computer program that, when executed, causes the processor 110 to perform steps necessary to encode the color values in the input document 140. Generally, the encoding software 130 may clip the color values in the input document 140 to an input range of interest, encode the input color values by shifting and scaling each input color value from the input range of interest to the range required by the format of the output document 150, and create an output document 150 that includes the encoded color values 152. In creating the output document 150, the encoding software 130 may also create an indicator 154 that signals that the color data in the output document 150 is actually data from a certain input color space that has been encoded. The encoding software 130 may also include other steps that convert other types of data, such as text data and certain graphics data, from the format of the input document 140 to the format of the output document 150.

An input document 140 is an electronic document or file that has any format that supports over-range color data. This includes, but is not limited to, Extensible Markup Language Paper Specification (XPS). The over-range color data may be in one of a variety of color spaces, such as scRGB, e-sRGB, e-sYCC, and xvYCC. The input document 140 may also include other data, such as text, embedded fonts, images and 2D vector graphics data (data in addition to related color data), digital rights management information, and other types of non-color data.

An output document 150 is an electronic document or file that is in a format that does not readily support over-range color data. This includes, but is not limited to, portable document format (PDF), Joint Photographic Experts Group (JPEG), Tagged Image File Format (TIFF), and Portable Network Graphics (PNG) file formats. The output document 150 includes encoded color data 152 and an indicator 154. The indicator 154 signals to an application reading the output document 150 that the color data contained in the output document 150 has been encoded. The indicator 154 may also specify the conversion of the encoded color data 152 to a device-independent color space, as would be the case when the indicator 154 is an International Color Consortium (ICC) profile.

In operation, the system 100 may receive an input document 140 and store it in memory 120. The processor 110 may load the encoding software 130. The processor 110, executing the encoding software 130, may read the input document 140 from memory 120, clip the color values in the input document 140 to an input range of interest, encode the input color values by shifting and scaling each input color value from the input range of interest to the range required by the format of the output document 150, and create an output document 150 that includes the encoded color values 152.

The input range of interest may be determined by a number of factors. One may be the range of colors specified by the standard defining the format of the input document 140. For example, the Extensible Markup Language Paper Specification (XPS) may define that color values in its documents are in the scRGB color space and may be expressed as 16-bit fixed-point (1 sign bit, 2 integer bits, and 13 fractional bits) values that range from −4 to 3.9998779296875. Colors received outside this range may be very rare; therefore, it may be appropriate to set this range as the range of interest when encoding XPS documents. The range required by the output document 150 is usually 0 to 1, as would be the case if the output document 150 was formatted in PDF.

Figure 2:
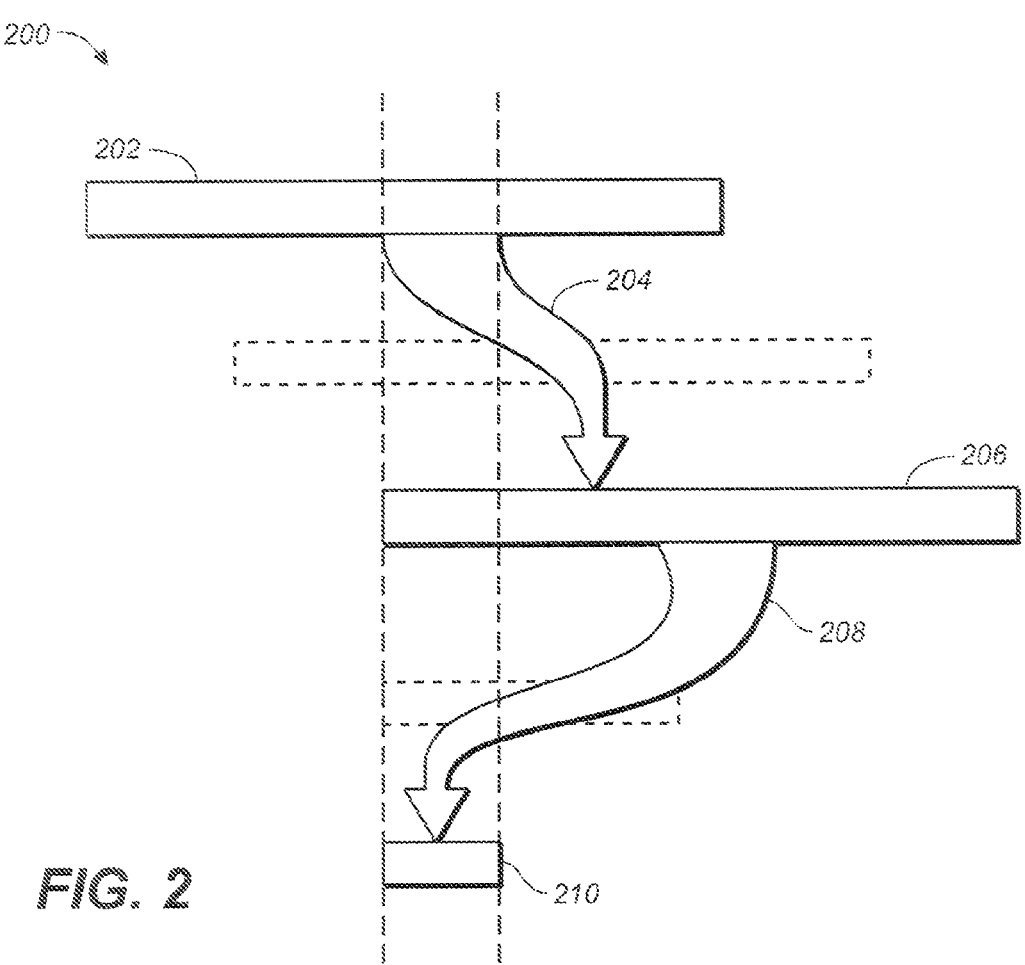
FIG. 2 is an illustration of the encoding process.

As demonstrated in FIG. 2, to encode 16-bit values 202 (described above as ranging from −4 to 3.999+) as values in a 0 to 1 range 210, the 16-bit values 202 may be shifted (at 204) to a 0 to 7.999+ range 206, and then scaled (at 208) to a 0 to 1 range 210. Shifting and scaling may involve first determining the difference resulting from subtracting the minimum value of the range of interest from the maximum value in the range, which in the XPS example would be 7.9998779296875. Second, the reciprocal of the difference may then be multiplied by the difference of the minimum value of the range subtracted from an input color value 142 to determine the encoded value 152 corresponding to the input color value 142. There are many mathematical equivalents to the foregoing steps that may be performed in their stead. Different steps may also be performed if the range required by the format of the output document 150 is not 0 to 1.

The encoding steps described above would linearly scale values from the input range to the output range. This is not a requirement however. Indeed, different sub-ranges within the range of interest may be encoded differently such that greater precision is achieved in encoding color values in certain ranges. This would involve a technique described in U.S. patent application Ser. No. 11/770,440, entitled "SYSTEM AND METHOD FOR CONVERTING OVER-RANGE COLORS," to inventors Kulkarni, et al., which was filed on Jun. 28, 2007. The disclosure of this just mentioned application is incorporated in its entirety herein by reference. This technique may be useful because often the input document 140 may have greater color depth than the output document 150. For example, the input document 140 may use 16 bits per channel to encode colors, but the output document 150 may use 8 bits per channel. By assigning accuracy ranks to various sub-ranges of the range of interest, the color data in the more important ranges are more precisely preserved. In creating the output document 150, the encoding software 130 may also create an indicator 154 that signals that the color data in the output document 150 is actually data from a certain input color space that has been encoded.

The processor 110 may execute other steps, which may or may not be included in encoding software 130, that convert other types of data, such as text data and certain graphics data, from the format of the input document 140 to the format of the output document 150.

An electronic document (which for brevity will simply be referred to as a document) does not necessarily correspond to a file. A document may be stored in a portion of a file that holds other documents, in a single file dedicated to the document in question, or in multiple coordinated files.

Figure 3:
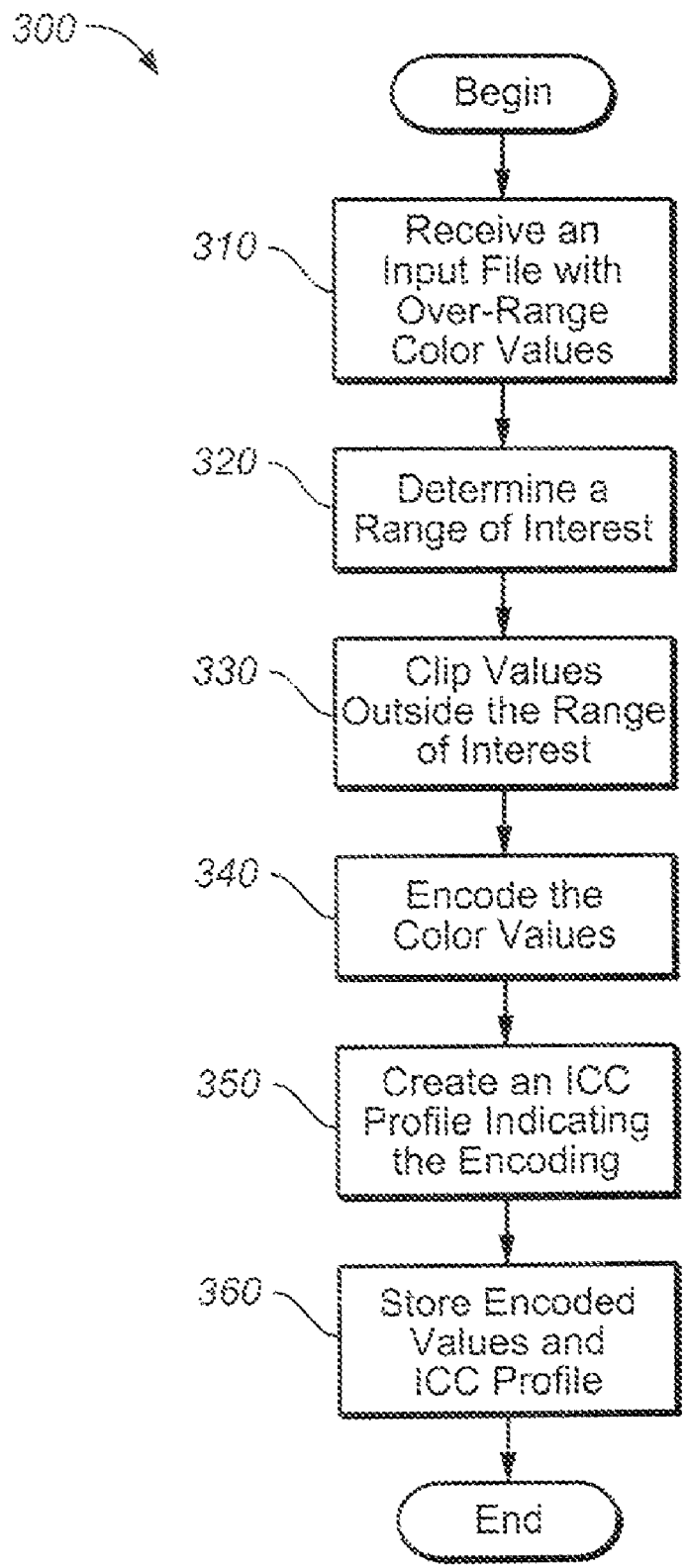
FIG. 3 is a flow chart illustrating a method for encoding over-range color values.

FIG. 3 is a flow chart illustrating a process 300 for encoding over-range color values. Generally, process 300 involves encoding the color values of an input color file into a range required by the output color file. At step 310, an input file containing at least one over-range color value is received. At step 320, a range of interest of input color values is determined. The range of interest may vary depending on the application and/or the color spaces involved. The range of interest may also be different for different color component values. For example, in an RGB input color space, the range of interest for the red component may be from −4 to +2, while the range of interest for green may be −1 to +4. Values outside the range of interest are clipped for each component at step 330. Clipping involves setting a value that is outside of a given range to the minimum or maximum for that range. For example, a red component value of +3.793 may be reduced to +2 if the range of interest is from −4 to +2. Similarly, a green component value of −2.382 may be increased to −1 if the range of interest for the green component is −1 to +4.

At step 340, the input color component values are encoded to correspond with the requirements of the output file, which may vary. Typically, the output file will require that the color component values be in the range of 0 to 1. The encoding may be accomplished in a variety of ways. One way may be to shift and scale. For example, if the range of interest for a certain component was −4 to +2, the encoding may involve shifting the values in the range by subtracting −4 from the input value, and then scale the values by dividing by 6, which would result in output values being in the range of 0 to 1. Because the data is being encoded and not converted from one color space to another, different component values may be encoded differently. For example, an input file for which subtle changes in the green component in the range of 0.5 to 1 are most important to preserve, may be encoded using a methodology that provides greater precision for values in the range of 0.5 to 1, while other color component values are encoded using a linear shift and scale methodology.

At step 350, an ICC profile is created. Generally, an ICC profile, associated with a particular color space, is a file that contains information on converting color values in the particular color space to a color values in another, usually device-independent, color space. The ICC profile may contain information that facilitates the decoding of the encoded data, in addition to relating the decoded color data to a device independent color space. The ICC profile may facilitate the direct conversion of the encoded data to a device-independent color space without first explicitly decoding the encoded color data.

Any other indicator that signals that the color data is encoded from a given color space may be used instead of the ICC profile.

At step 360, the encoded values and the ICC profile are stored in an output file. The encoded data would conform to the requirements of the output file format. The ICC profile may be embedded in the output file such that the output file is self-contained. That is, the data in the output file may be interpreted correctly using only the information stored in the file itself.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving an input file including input color values in a first color space, wherein at least one input color value includes an over-range color value in the first color space;
   encoding the input color values including encoding each over-range color value as an in-range color value in the first color space to generate encoded input color values, wherein encoding the input color values includes:
      determining a range of interest for the input color values;
      dividing the range of interest into a plurality of sub-ranges; and
      encoding the input color values based on a level of accuracy assigned to a sub-range that the input color value falls within; and
   creating an output file including the encoded input color values and an indicator, wherein the indicator indicates that the output file includes the encoded input color values.

2. The method of claim 1, further comprising decoding the color values in the output file based on the indicator.

3. The method of claim 1, wherein the first color space comprises an scRGB color space.

4. The method of claim 1, wherein the input file comprises an Extensible Markup Language Paper Specification (XPS) file.

5. The method of claim 1, wherein the at least one input color value is less than zero or greater than one.

6. The method of claim 1, wherein encoding the input color values includes:
   clipping the input color values to fit within a pre-determined range;
   subtracting the minimum value of the predetermined range from the maximum value of the predetermined range to obtain a first difference;
   determining an encoded value for each input color value by subtracting the minimum value from the input color value to obtain a second difference and dividing the second difference by the first difference.

7. The method of claim 6, wherein the pre-determined range is based on the range of color values in the input file.

8. The method of claim 6, wherein the pre-determined range ranges from −4 to +3.9998779296875.

9. The method of claim 1, wherein the output file is one of the set containing: a portable document format (PDF) file, a Joint Photographic Experts Group (JPEG) file, or a Tagged Image File Format (TIFF) file.

10. The method of claim 1, wherein the in-range ranges from 0 to 1.

11. The method of claim 1, wherein the indicator comprises an International Color Consortium (ICC) profile.

12. The method of claim 11, wherein the ICC profile includes decoding information.

13. A computer program product, encoded on a computer-readable medium, operable to cause data processing apparatus to perform operations comprising:
   receiving an input file including input color values, wherein at least one input color value has a corresponding value in an output color space that is outside of a range of values supported by an output file format;
   encoding the input color values including encoding each input color value as a value supported by the output file format to provide each encoded input color value, wherein encoding the input color values includes:
      determining a range of interest for the input color values;
      dividing the range of interest into a plurality of sub-ranges; and
      encoding the input color values based on a level of accuracy assigned to a sub-range that the input color value falls within; and
   creating an output file having the output file format, wherein the output file includes the encoded color values and includes an indicator that the output file includes encoded color values representing input color values having corresponding values in the output color space that are outside of a range of values supported by the output file format, wherein the indicator is included in an International Color Consortium (ICC) profile.

14. The product of claim 13, wherein the at least one input color value comprises an over-range color value.

15. The product of claim 13, wherein encoding the input color values comprises:
   clipping the input color values to fit within a range of interest;
   subtracting the minimum value of the range of interest from the maximum value of the range of interest to obtain a first difference;
   determining an encoded value for each input color value by subtracting the minimum value from the input color value to obtain a second difference and multiplying the second difference by the reciprocal of the first difference.

16. A system comprising:
   a memory operable to store a first electronic document comprising input color component values corresponding to a first color space defining a set of in-range values and a set of over-range values, wherein at least one input color component value comprises an over-range value; and
   a processor communicatively coupled to the memory operable to:
      encode the input color component values, wherein each encoded input color value comprises an in-range value;
      generate a second electronic document comprising the encoded color component values and a color profile, wherein the color profile provides information for decoding the encoded color component values;
      identify a plurality of sub-ranges for the color component values;
      determine for each sub-range a level of accuracy in encoding color component values within the sub-range;
      determine a first sub-range for a first input color component value;
      encode the first input color component value based on the determined level of accuracy for the first sub-range;
      determine a second sub-range for a second input color component value; and
      encode the second input color component value based on the determined level of accuracy for the second sub-range.

17. The system of claim 16, wherein the color profile is an International Color Consortium (ICC) profile that can be used to convert the encoded color component values to a device-independent color space.

18. The system of claim 16, wherein the first electronic document comprises an XPS document and the second electronic document comprises a PDF document.

19. The system of claim 16, wherein the processor is further operable to:
 clip the input color component values that are greater than a pre-determined upper threshold;
 clip the input color component values that are less than a pre-determined lower threshold; and
 encode each input color component value by dividing a difference of the input color component value minus the pre-determined lower threshold by a difference of the pre-determined upper threshold minus the pre-determined lower threshold.

20. The system of claim 16, wherein the processor is further operable to:
 encode an input color component value of a first component, wherein encoding includes clipping the value using a first range of interest; and
 encode an input color component value of a second component, wherein encoding includes clipping the value using a second range of interest.

21. The system of claim 16, wherein the processor is further operable to:
 determine a range of interest of color component values; and
 divide the range of interest into the plurality of sub-ranges.

22. The system of claim 16, wherein each encoded input color value corresponds to a second color space different from the first color space.

23. The system of claim 16, wherein the second electronic document is formatted to a predetermined format, wherein the predetermined format limits color component values to a predetermined minimum value and a predetermined maximum value that correspond to the minimum and maximum values of the in-range values.

24. The system of claim 16, wherein the set of in-range values for the first color space includes a predetermined minimum color value and a predetermined maximum color value that bound a substantial continuum of intensities for at least one color component and the set of over-range values comprises values representing intensities for the at least one color component outside of the bounded substantial continuum of intensities.

* * * * *